Patented Jan. 27, 1931

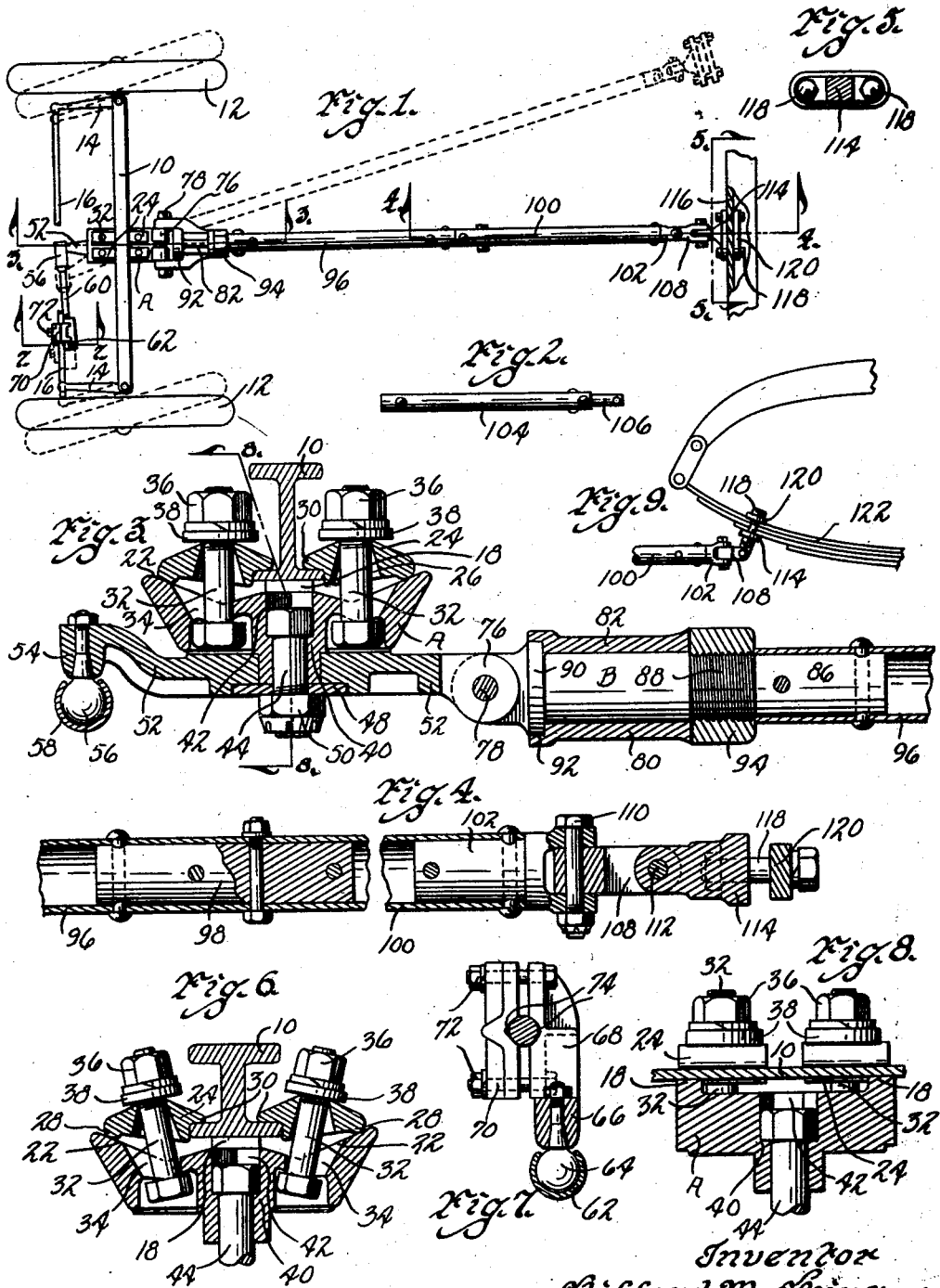

1,790,216

UNITED STATES PATENT OFFICE

CLIFFORD M. AKINS, OF MINNEAPOLIS, MINNESOTA, ASSIGNOR TO MARQUETTE MANUFACTURING CO., OF ST. PAUL, MINNESOTA

TOW-POLE CONSTRUCTION

Application filed April 30, 1929. Serial No. 359,266.

The object of my invention is to provide a tow pole construction of simple, durable and inexpensive manufacture.

A further object of my invention is to provide a tow pole for towing disabled vehicles, new cars from freight depots and assembly plants, behind a towing car, the tow pole being adapted for attachment to the front axle of the vehicle being towed, and operatively connected with the steering mechanism of the front wheels thereof, whereby the vehicle being towed will be steered by the towing car without the necessity of having a driver in the towed vehicle.

More particularly it is my object to provide in such a construction a novel type of fitting to be attached to the front axle of the towed vehicle, being universally arranged for attachment to the various sizes of front axle members.

Still a further object is to provide a novel connection between the pole portion of the tow pole and the portion thereof which is pivotally secured to the fitting.

With these and other objects in view my invention consists in the construction, arrangement and combination of the various parts of my device, whereby the objects contemplate are attained, as hereinafter more fully set forth, pointed out in my claims, and illustrated in the accompanying drawings, in which:

Figure 1 is a plan view of the front axle and wheels of a vehicle showing my improved type of tow pole construction applied thereto and attached to the rear frame member of a towing vehicle.

Figure 2 is an extension element for the tow pole.

Figure 3 is an enlarged sectional view on the line 3—3 of Figure 1.

Figure 4 is an enlarged sectional view on the line 4—4 of Figure 1.

Figure 5 is a sectional view on the line 5—5 of Figure 4.

Figure 6 is a sectional view similar to a portion of Figure 3 illustrating the setting applied to another size of front axle.

Figure 7 is an enlarged sectional view on the line 7—7 of Figure 1.

Figure 8 is a sectional view on the line 8—8 of Figure 3; and

Figure 9 is a side elevation of the forward end of the tow pole structure showing it secured to the spring of a towing vehicle.

On the accompanying drawings I have used the reference numeral 10 to indicate the front axle of a vehicle or the like to which the tow pole is secured. The axle 10 is provided with steerable wheels 12 mounted on spindles which have steering arms 14. The arms 14 normally are connected by a tie rod 16. The foregoing description applies to the front axle of an automobile of general construction. It is my purpose to provide a tow pole consisting of a fitting adapted to be clamped to the axle 10, and a tow pole portion pivoted to the fitting A and connected with the tie rod 16 whereby pivotal movement of the tow pole as to the dotted line position shown in Figure 1 will impart steering movement to the wheels 12.

The tow pole construction consists of a fitting A having a pair of pads 18 adapted to engage the axle 10 at spaced points, as best shown in Figure 8. The fitting A is provided with two inclined surfaces 22 extending the entire width of the fitting A and with which clamping lugs 24 are associated. The clamping lugs 24 are substantially rectangular in plan view and in cross section are of the shape shown in Figure 3. They are provided with tapered openings 26 and their ends are indicated by the reference numerals 28 and 30. The ends 28 are adapted to engage the inclined surfaces 22.

The ends 30 of the clamping lugs 24 are adapted to engage the lower flange of the axle 10. Clamping bolts 32 extend upwardly through tapered openings 34 in the fitting A and through the tapered openings 26 of the clamping lugs 24. Nuts 36 are provided on the upper ends of the clamping bolts 32 and washers 38 are interposed between the nuts 36 and the lugs 24. The nuts 36 are adapted to be tightened so that the ends 28 of the lugs 24 will pivotally engage the inclined surfaces 22 and cause the ends 30 to bear against the lower flange of the axle 10 which rests upon the pad 18 of the fitting A.

The surfaces 22, being inclined, gives an inward and downward action to the ends 30 of the lugs 24 upon tightening the nuts 36 or the bolts 32.

The fitting A is provided with a boss 40 between the pads 18. The boss 40 is provided with a socket 42 adapted to receive the head of a pivot bolt 44. The pivot bolt 44 extends through a hub 46 of the boss 40 and through a washer 48 and is provided with a castle nut 50 whereby the boss 40, with its hub 46 and the washer 48 are firmly clamped together.

Pivotally mounted on the hub 46 is an arm 52 having its rear end provided with a hub 54. A ball member 56 is associated with the hub 54 and is received by a socket member 58. The socket member 54 is formed on one end of a link 60 which at its other end is provided with a socket member 62. The socket member 62 receives a socket ball member 64.

The ball member 64 is secured to a hub 66 of a clamp member 68. The clamp member 68 has associated therewith a clamp cap 70 and the two may be drawn together by tightening bolts 72. The members 68 and 70 are provided with notches 74 to receive the tie rod 16. From the foregoing construction it will be obvious that an operative connection is provided between the arm 52 and the tie rod 16 so that pivotal movement of the arm will cause longitudinal movement of the tie rod and thereby effect steering of the wheels 12.

The arm 52 is provided with a forked hub 76 adapted to receive a pivot bolt 78. A forked fitting 80 is mounted on the pivot bolt 78 as best shown in Figure 1, and is provided with a hub 82. A draft pin B is associated with the hub 82 and has portions 84 and 86 with an intermediate threaded portion 88. The pin B is provided with a head 90 adapted to fit in a socket 92 of the hub 82 and operate in conjunction with a nut 94 at the other end of the hub to securely but swivelly hold the draft pin B is the forked fitting 80.

A tow pole construction consisting of a tube 96, connecting plug 98, second tube 100 and a universal fork 102 is secured to the portion 86 of the draft pin B. The tube 96 is riveted to the portion 86 and to one end of the plug 98. The tube 100 is bolted to the other end of the plug 98 and riveted to the universal fork 102.

In Figure 2 I show a third tube 104 having a connector plug 106 which may be inserted between the plug 98 and the tube 100 for lengthening the tow pole. The tube 104 is bolted to the plug 98 and the tube 100 is bolted to the plug 106.

For connecting the tow pole to a towing vehicle I provide a universal joint consisting of a fitting 108 having vertical pivotal connection 110 with the universal fork 102 and a horizontal pivotal connection 112 with a fastening member 114. The fastening member 114 is adapted to be positioned against the rear flange 116 of the rear frame member of a towing car and to be bolted relative thereto by bolts 118. The bar 120 is adapted to be positioned on the inside of the flange 116.

In Figure 9 I have illustrated another manner of connecting the forward end of the tow pole to the towing vehicle. In this instance, the fastening member 144 is clamped against the bottom of the spring 122 of the towing vehicle, the bar 120 being positioned above the spring and the bolts 118 on each side thereof. The pivot bolt 112 being horizontally arranged allows the fastening member 114 to assume this position as readily as the position shown in Figure 1.

From the foregoing construction it will be readily obvious that I have provided an automatic tow pole which may be applied to any size of axle. For instance, in Figure 6 a wider axle is illustrated in which event the bolts 32 may be arranged at an angle as shown. In the event that the lower flange of the axle is thicker the angle of the lugs 24 will be changed to accommodate such thickness. The fitting A therefore is universally adapted for all sizes of front axle members.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a tow pole construction, an axle engaging member having inclined surfaces, bolts extending through said member and projecting from said surfaces, clamping lugs on said bolts, one end of each lug being adapted to engage one of said inclined surfaces and the other end to engage the axle of a vehicle, a tow pole pivoted to said axle engaging member and means for connecting said tow pole with the steering tie rod of said vehicle.

2. In a tow pole construction, an axle engaging member having inclined surfaces, bolts extending through said member, pivotally mounted relative thereto, and projecting from said surfaces, clamping lugs on said bolts, one end of each lug being adapted to engage one of said inclined surfaces and the other end to engage the axle of a vehicle, a tow pole pivoted to said axle engaging member and means for connecting said tow pole with the steering tie rod of said vehicle.

3. In a tow pole construction, an axle engaging member having inclined surfaces, bolts extending through said member and projecting from said surfaces, clamping lugs on said bolts, said lugs being pivotally mounted relative to the bolts, one end of each lug being adapted to engage one of said inclined surfaces and the other end to engage the axle of a vehicle, a tow pole pivoted to said axle engaging member and means for connecting said tow pole with the steering tie rod of said vehicle.

4. In a tow pole construction, an axle engaging member having inclined surfaces, bolts extending through said member, pivotally mounted relative thereto and projecting from said surfaces, clamping lugs on said bolts, said lugs being pivotally mounted relative to the bolts, one end of each lug being adapted to engage one of said inclined surfaces and the other end to engage the axle of a vehicle, a tow pole pivoted to said axle engaging member and means for connecting said tow pole with the steering tie rod of said vehicle.

5. In a tow pole construction including an axle engaging member adapted to engage one side of an axle, lug bolts pivoted thereto, clamping lugs on said bolts, said lugs each having an end to engage said member and another end to engage opposite side portions of said axle and clamp it between said last mentioned end and said axle engaging member, said clamping bolts being located substantially midway between the ends of said lugs.

6. A tow pole construction including an axle engaging member adapted to engage one side of an I shaped axle having inclined surfaces, lug bolts pivoted thereto, clamping lugs on said bolts, said lugs each having an end to engage one of said inclined surfaces of said member and another end to engage oppositely extending flanges of said axle and clamp it between said last mentioned ends and said axle engaging member.

7. In a tow pole construction including an axle engaging member, lug bolts extending therethrough, clamping lugs on said bolts, said lugs each having an end to engage said member and another end to engage an axle and clamp it between said last mentioned end and said axle engaging member, said member and said lugs having tapered openings for said bolts whereby they can be arranged at relatively varying angles to accommodate axles of different cross sectional sizes.

8. In a tow pole construction, an axle engaging member, means for clamping it to the axle of a vehicle, said means comprising a bolt, a lug and a nut, said bolt extending through said member and said lug, the surfaces of said member and lug adjacent the head of the bolt and the nut being formed like an obtuse angle so that the bolt can be arranged at relatively varying angles to accommodate axles of different cross sectional sizes, a tow pole pivoted to said axle engaging member and means for connecting said tow pole with the steering tie rod of said vehicle.

Des Moines, Iowa, April 11, 1929.
CLIFFORD M. AKINS.